(12) United States Patent
Grau et al.

(10) Patent No.: US 6,629,668 B1
(45) Date of Patent: Oct. 7, 2003

(54) JUMP CORRECTING PROJECTILE SYSTEM

(75) Inventors: John C. Grau, Sussex, NJ (US);
Arthur J. Fiorellini, Sussex, NJ (US);
Raymond E. Carr, Newton, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/062,092

(22) Filed: Feb. 4, 2002

(51) Int. Cl.$^7$ ................................................ F42B 10/00
(52) U.S. Cl. ...................................... 244/3.22; 244/3.21
(58) Field of Search ............................ 244/3.1, 3.2, 3.3, 244/3.22; 701/2, 6, 8, 10, 11, 26; 89/1.3, 1.42, 1.56; 102/398, 520, 511

(56) References Cited

U.S. PATENT DOCUMENTS

| | | | | |
|---|---|---|---|---|
| 3,753,537 A | * | 8/1973 | Karpa et al. | 244/3.12 |
| 4,173,785 A | * | 11/1979 | Licata | 701/220 |
| 5,080,301 A | * | 1/1992 | Knoche et al. | 244/3.22 |
| 5,143,320 A | * | 9/1992 | Boyadjian | 244/3.21 |
| 5,259,569 A | * | 11/1993 | Waymeyer et al. | 244/3.22 |
| 5,375,792 A | * | 12/1994 | Grau | 244/3.22 |
| 5,631,830 A | * | 5/1997 | Schroeder | 701/4 |
| RE37,331 E | * | 8/2001 | Schroeder | 701/4 |
| 6,308,911 B1 | * | 10/2001 | Schroeder | 244/3.22 |
| 2003/0042355 A1 | * | 3/2003 | Rodden et al. | 244/3.21 |

* cited by examiner

Primary Examiner—Charles T. Jordan
Assistant Examiner—Stephen A Holzen
(74) Attorney, Agent, or Firm—Michael C. Sachs; John F. Moran

(57) ABSTRACT

A system for controlling the trajectory of a launched projectile. More particularly, a method for correcting the projectile jump displacement of a launched projectile after it is released from a vessel using on-board G-hardened accelerometers orthogonally mounted along the longitudinal axis of the projectile. Deviation from an intended flight path is corrected by firing selected trajectory diverting thrusters mounted around the periphery of the projectile. Eliminating or reducing projectile jump, or the angular deviation of the flight path of a projectile relative to its intended trajectory, will greatly increase the accuracy of gun fired projectiles.

9 Claims, 1 Drawing Sheet

JUMP CORRECTING PROJECTILE SYSTEM

U.S. GOVERNMENT INTEREST

The inventions described herein may be manufactured, used and licensed by or for the U.S. Government for U.S. Government purposes.

BACKGROUND OF THE INVENTION

1. Field of the Invention

The present invention relates to a system for controlling the trajectory of a launched projectile. More particularly, the invention pertains to a method for correcting the displacement of a launched projectile after it is released from a launch platform using on-board control technology.

2. Description of the Related Art

The effectiveness of gun launched projectiles is directly related to the accuracy with which they can be delivered to a target. Over the years, numerous advancements have been made to gun systems that have greatly improved the accuracy with which projectiles can be delivered to the target. Among these advancements are aerodynamically stable projectiles, longer barrels, improved barrel straightness, tighter tolerances on gun-projectile interface, higher muzzle velocities, and improved sighting and fire control systems. Although these efforts have significantly improved targeting accuracy, there is constant need in the military for increased effectiveness in delivery accuracy. This need and desire for high delivery accuracy led to the development of fully guided or "smart" munitions. Guided munitions utilize various seekers coupled to some type of trajectory divert system (control fins, thrusters) through a closed loop control system to continuously track and maneuver toward the target.

Two categories of guided munitions systems are generally known in the art, autonomous and command guided weapons. Autonomous guided weapons generally contain control thrusters, attitude sensors, optical and/or radar based target sensors, hardware and software to accomplish target tracking, and projectile control processors for making guidance computations. Such known autonomous guided weapons include The Maverick, Stinger and Advanced Medium Range Air-To-Air Missile (AMRAAM).

Known command guided systems involve more control by an operator than automated systems. These systems generally use optical sensors or radar to image targets toward which an operator will lead the weapon, such as by tracking the weapon by a command unit that senses a beacon on the weapon and commands it via a trailing wire to fly along a line of sight. Weapons of this type, such as a Tube-launched Optically tracked, Wire guided (TOW) missile, typically carry an attitude reference gyro to define body roll position and an aerodynamic tail control system. Further, U.S. Patriot missiles are known to use attitude reference systems to cause commanded maneuvers to occur in the commanded direction. Further description of automated and command guided weapons systems can be found, for example, in U.S. Pat. No. 5,685,504.

While guided projectiles like these offer the possibility of pinpoint accuracy at extended ranges they suffer from a number of disadvantages relative to unguided projectiles. Maneuvering all the way to the target requires large divert capability which leads to large interior volume requirements. Large rounds tend to have low muzzle velocity and high drag which may lead to a need for an on board propulsion system in order to achieve acceptable terminal ballistic performance. Also, complex navigation systems employing autopilots and inertial measurement units may be needed. All of these systems tend to be costly and have survivability issues in the high acceleration gun launch environment. Guided projectiles are also difficult to develop and tend to be very costly relative to unguided ammunition. Accordingly, it is desirable to have projectiles with improved accuracy relative to unguided rounds without the complexity of a fully guided projectile. The present invention provides a solution to this need.

It has been found that eliminating or reducing projectile "jump", or the angular deviation of the flight path of a projectile relative to its intended trajectory, will greatly increase the accuracy of gun fired projectiles. Projectile jump arises from launch disturbances imparted to the projectile just prior to, during, and shortly after muzzle exit. The present invention uses on-board instrumentation and control technology for measuring projectile jump and correcting the flight path of the projectile toward its originally intended trajectory. This has been found to significantly improve delivery accuracy of a weapon, without the complexity and high cost involved with fully guided systems.

SUMMARY OF THE INVENTION

The invention provides a trajectory controlled projectile comprising:

- a projectile having a longitudinal axis;
- at least one pair of orthogonally positioned accelerometers within the projectile, each mounted perpendicular to the longitudinal axis of the projectile, said at least one pair of accelerometers providing projectile acceleration data to a microprocessor mounted on the projectile;
- an array of thrusters mounted around an outer periphery of the projectile which are positioned to exert a thrust normal to the longitudinal axis of the projectile upon deployment by a signal from the microprocessor corresponding to the acceleration data.

The invention also provides a method for controlling the trajectory of a launched projectile comprising:

a) providing a projectile having a longitudinal axis;
   - at least one pair of orthogonally positioned accelerometers within the projectile, each mounted perpendicular to the longitudinal axis of the projectile, said at least one pair of accelerometers providing projectile acceleration data to a microprocessor mounted on the projectile; and
   - an array of thrusters mounted around an outer periphery of the projectile which are positioned to exert a thrust normal to the longitudinal axis of the projectile upon deployment by a signal from the microprocessor corresponding to the acceleration data;

b) engaging said projectile with a mounting platform and orienting said projectile in an initial target direction;

c) launching the projectile away from the platform toward a target;

d) measuring the acceleration data of the projectile with the accelerometers during and immediately after said launching away from the platform and signaling the acceleration data to the microprocessor;

e) calculating any angular deviation in the position of the projectile longitudinal axis from its pre-launch initial target direction via the microprocessor using the acceleration data; then f) deploying one or more of the thrusters to cause a correcting thrust normal to the longitudinal axis of the projectile via a signal from the microprocessor corresponding to the acceleration data.

DETAILED DESCRIPTION OF THE PREFERRED EMBODIMENTS

Figure 1:
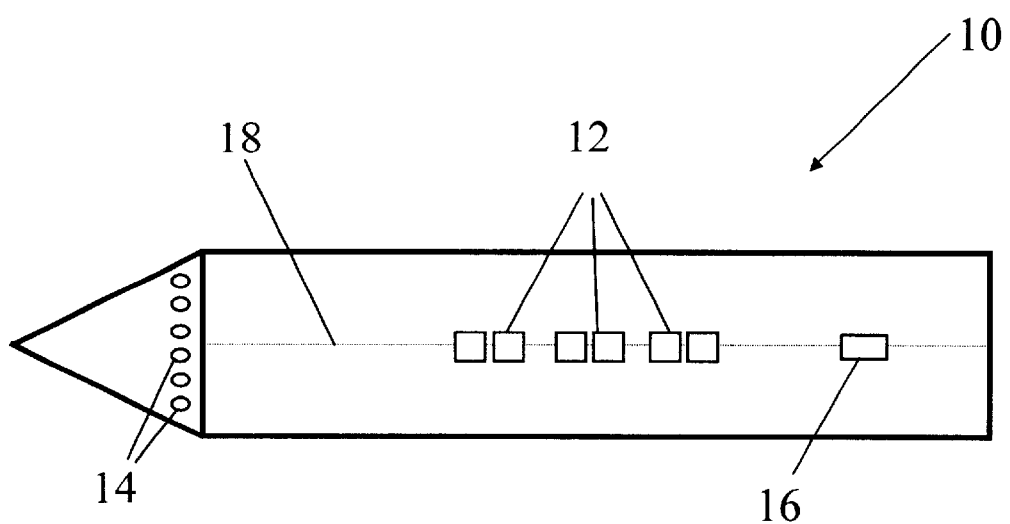
FIG. 1 is a top view of the inside of a projectile having a plurality of orthogonal pairs of accelerometers and a roll rate sensor positioned along a longitudinal axis of a projectile and thrusters positioned at the front of the projectile.

The claimed invention provides a system for correcting projectile jump, or angular deviation of the flight path of a projectile relative to its intended trajectory. The claimed system is intended for use with guided projectiles having on-board thrusters for directing the projectile toward a target.

Referring to FIG. 1, a projectile 10 having a front end, a back end and a longitudinal axis is shown. The projectile 10 engages or is mounted on or in a suitable launch platform, such as an airplane or cannon (not shown). Mounted on the projectile 10 is at least one pair of accelerometers 12. Each accelerometer is capable of sending projectile acceleration data to a microprocessor (not shown) mounted on or within the projectile. The microprocessor then computes the information required to correct any projectile jump. In the preferred embodiment of the invention, the at least one pair of accelerometers 12 are orthogonally positioned within the projectile and are mounted perpendicular to the longitudinal axis 18 of the projectile 10 at its center of gravity. This can be seen in FIG. 1.

Illustrated in FIG. 1 is an embodiment of a projectile 10 having a plurality of pairs of orthogonally situated accelerometers 12. Utilizing at least one orthogonal pair of accelerometers positioned at the center of gravity along the central longitudinal axis 18 of a projectile 10 greatly improves the accuracy of the readings sent from the accelerometers 12 to the microprocessor. While multiple pairs of accelerometers 12 are suitable within the scope of the invention, in the most preferred embodiment of the invention only one pair of orthogonal accelerometers 12 is used. If multiple pairs are used, each pair is preferably positioned equidistant from the center of gravity of the projectile. However, it is generally only preferred to use multiple pairs of accelerometers 12 if mounting of the accelerometers at the projectile 10 center of gravity is not practical for a particular application. In this embodiment, the same result as with a single pair of accelerometers can be obtained by taking the difference of the multiple outputs from the multiple pairs of accelerometers. Further, in the preferred embodiment of the invention, only one microprocessor is used to which all accelerometers 12 send their signals.

Suitable accelerometers 12 for use in the invention are well known in the art. Known accelerometers may be mechanical or electromechanical instruments suitable to measure either translational or angular acceleration. Of these, translational accelerometers are preferred for use within the claimed invention. Translational accelerometers are generally seismic instruments that do not measure accelerations with respect to a particular reference point. Rather, they typically measure the attainment of a predefined acceleration level or measure acceleration continuously. Continuously measuring accelerometers generally comprise a damped or undamped, spring-supported seismic mass mounted via the spring to a housing. The mass is typically restrained to move only along a predefined axis. The accelerometer also has a sensing device or axis that measures acceleration. Suitable sensing devices depend on whether the accelerometer is a mechanical or electromechanical instrument. For example, electromechanical instruments typically utilize variable-resistance, variable-inductance, piezoelectric, piezotransistor or servo accelerometer sensing devices. Each of these are well known in the art. For examples of accelerometers, see U.S. Pat. Nos. 4,094,199, 4,144,765, 4,206,400, 4,226,120, 4,319,488, 4,712,427, 4,736,629, 5,220,835 and 5,996,411 which are incorporated herein by reference. In the preferred embodiment of the invention, the sensing axis of the accelerometer 12 is positioned normal to the longitudinal axis of the projectile 10.

The most preferred accelerometers for use in the claimed invention are miniature accelerometers that have been G-hardened. G-hardened devices are devices that are adapted (or "G-hardened") to survive a high acceleration environment, such as that associated with launching of a weapon from a vessel or cannon. See, for example, U.S. Pat. Nos 4,690,351, 5,219,132, and 5,909,275 which teach general G-hardened devices. Also, see generally U.S. Pat. Nos. 4,882,933, 5,591,910 and 5,614,742 which show suitable accelerometers within the scope of the invention.

Also preferably mounted along a longitudinal axis of the projectile 10 is a roll rate sensor 16. The roll rate sensor is a device that measures the rate at which the projectile 10 rolls while in flight. This roll rate sensor is capable of sending signals to the microprocessor, preferably through a direct electrical connection, with the signals containing such information about the roll rate of the projectile 10. The microprocessor uses this information to determine any time delay required to allow the projectile to roll into the proper orientation for an array of thrusters to correct any projectile jump displacement. If incorporated, the roll rate sensors preferably comprise miniature G-hardened sensors. In another preferred embodiment of the invention, the roll rate is preprogrammed into the microprocessor based on the expected roll behavior of the projectile, rather than using a separate roll rate sensor.

The projectile 10 also includes an arrangement of impulse thrusters 14 mounted around an outer periphery of the projectile. Thrusters 14 are suitable for altering the trajectory of the flight of the projectile 10 after is has been launched into the air by exerting a thrust normal to the longitudinal axis of the projectile upon deployment by a signal from the microprocessor corresponding to acceleration data. As seen in FIG. 1, the thrusters 14 are preferably mounted around a front end, or nose cone portion of the projectile. Thrusters 14 may also be mounted at a location behind the nose cone portion of the projectile and at or near the outer periphery of the projectile. Any conventionally known thruster system is suitable for use within the scope of the invention. For example, the thrusters 14 may comprise multiple rings of different sized thrusters, or a single line of different sized thrusters. Such known thrusters systems for use on guided missiles include those used on U.S. Army Hypervelocity missiles and Command Adjusted Trajectory Projectile systems. Other examples of thruster systems can be found in U.S. Pat. Nos. 5,456,429, 5,238,204 and 4,967,982. Preferably, the thrusters comprise three or more single use thrusters of different sizes oriented to provide a short duration impulse normal to the projectile axis. Any thrusters fired are preferably fired simultaneously in various combinations to achieve a particular trajectory diversion.

The time at which the thrusters are fired, and the combination in which they are fired, is dependent upon the orientation and roll rate of the projectile and the type of thruster system used. For example, when using one or more rings of different sized thrusters, as soon as the orientation and roll rate of the projectile are sensed, the thrusters may be immediately fired upon completion of sensing, in the proper combination determined by the microprocessor. On the other hand, in an embodiment utilizing only a single line of different sized thrusters, once sensing is complete, the microprocessor may delay the firing of the thrusters for a time sufficient to allow the projectile to roll such that the thrusters are oriented in the desired direction for firing. This roll rate information may be determined either by using a roll rate sensor, as described above, or it may be a value which is preprogrammed into the microprocessor based on the expected roll behavior of the projectile.

Preferably the microprocessor comprises any microprocessor suitable for receiving a signal from the accelerometers 12 and is programmed to fire the thrusters in a combination necessary to correct displacement of the projectile 10 off target due to projectile jump. The microprocessor is situated on the projectile may receive signals from the accelerometers either via electromagnetic waves or by a direct electrical connection between the accelerometers and the microprocessor. In the preferred embodiment of the invention, the signals are transmitted via a direct electrical connection.

In use, the projectile 10 is mounted on a launch platform and engaged and oriented by the platform toward an initial target direction. Prior to launching the projectile 10, the accelerometer outputs are zeroed and any initial velocity ($V_i$) of the projectile 10 is determined. This initial velocity may be determined either via a signal sent to the microprocessor from an additional accelerometer, which additional accelerometer has a sensing axis aligned with the longitudinal axis of the projectile. If incorporated, said additional accelerometer is preferably directly electrically connected to the microprocessor. Alternately, the value of $V_i$ is preferably preprogrammed into the microprocessor. This preprogrammed value would be a function of ammunition temperature. The projectile 10 is then launched into motion away from the platform toward a target and the acceleration of the projectile 10 is constantly monitored with the accelerometers during and immediately after launching the projectile 10 away from the launch platform. The collected acceleration history data of the projectile 10 is then integrated by the microprocessor to determine a net normal velocity ($V_n$) of the projectile. In the preferred embodiment of the invention, the calculating of the acceleration history and integration of said acceleration history are conducted simultaneously by said microprocessor. Subsequently, the net normal velocity is then divided by the initial velocity of the projectile ($V_n/V_i$), to calculate $V_x$. Next, take the arctangent of $V_x$ via the microprocessor to calculate any angular deviation in the position of the projectile longitudinal axis from its pre-launch initial target direction. Once this angle of displacement is determined, the final step is to deploy one or more of the thrusters to cause a correcting thrust normal to the longitudinal axis of the projectile via a signal from the microprocessor corresponding to the acceleration data to correct the displacement of said projectile. Additionally, at this point, any roll displacement determined by a roll rates sensor may also be corrected by firing the thrusters in a combination determined by the microprocessor.

What is claimed is:

1. A jump correcting projectile system comprising:
   a projectile having a longitudinal axis;
   at least one pair of orthogonally positioned accelerometers within the projectile, each mounted perpendicular to the longitudinal axis of the projectile, said at least one pair of accelerometers providing projectile acceleration data to a microprocessor mounted on the projectile;
   an array of thrusters mounted around an outer periphery of the projectile which are positioned to exert a thrust normal to the longitudinal axis of the projectile upon deployment by a signal from the microprocessor corresponding to the acceleration data;
   wherein the projectile is engaged with a mounting platform and oriented in an initial target direction when engaged in the mounting platform;
   wherein the projectile is launched away from the Platform toward a target;
   wherein the acceleration data of the projectile is measured with the accelerometers during and immediately after said launching away from the platform and signaling the acceleration data to the microprocessor;
   wherein the microprocessor calculates a projectile jump by calculating any angular deviation, arising from launch disturbances imparted to the projectile just prior to, and shortly after the projectile is disengaged from the mounting platform, in the position of the projectile longitudinal axis from its pre-launch initial target direction using the acceleration data; and
   wherein one or more of the thrusters are deployed to cause a correcting thrust normal to the longitudinal axis of the projectile via a signal from the microprocessor corresponding to the acceleration data to correct for the projectile jump.

2. The jump correcting projectile of claim 1 wherein the projectile has a front end and a back end, and wherein the thrusters are mounted around a front end of the projectile.

3. The jump correcting projectile system of claim 1 further comprising at least one roll rate sensor mounted on the projectile and attached to said microprocessor.

4. The jump correcting projectile system of claim 1 wherein the at least one pair of orthogonal accelerometers are mounted along the central longitudinal axis of the projectile at the center of gravity of the projectile.

5. The jump correcting projectile system trajectory controlled projectile of claim 1 wherein the at least one pair of orthogonal accelerometers are mounted along the central longitudinal axis of the projectile at the center of gravity of the projectile, each pair being positioned about equidistant from the center of gravity of the projectile.

6. A jump correcting projectile method for controlling the trajectory of a launched projectile comprising:
   a) providing a projectile having a longitudinal axis;
      at least one pair of orthogonally positioned accelerometers within the projectile, each mounted perpendicular to the longitudinal axis of the projectile, said at least one pair of accelerometers providing projectile acceleration data to a microprocessor mounted on the projectile; and
      an array of thrusters mounted around an outer periphery of the projectile which are positioned to exert a thrust normal to the longitudinal axis of the projectile upon deployment by a signal from the microprocessor corresponding to the acceleration data;
   b) engaging said projectile with a mounting platform and orienting said projectile in an initial target direction;
   c) launching the projectile away from the platform toward a target;
   d) measuring the acceleration data of the projectile with the accelerometers during and immediately after said launching away from the platform and signaling the acceleration data to the microprocessor;

e) calculating projectile jump by calculating any angular deviation in the position, arising from launch disturbances imparted to the projectile just prior to, and shortly after the projectile is disengaged from the mounting platform, in the position of the projectile longitudinal axis from its pre-launch initial target direction via the microprocessor using the acceleration data; then f) deploying one or more of the thrusters to cause a correcting thrust normal to the longitudinal axis of the projectile via a signal from the microprocessor corresponding to the acceleration data to correct for the projectile jump.

7. The jump correcting projectile method of claim 6 comprising:

i) determining an initial velocity (Vi) of the projectile;

ii) determining acceleration data of said projectile with the accelerometers during and after launching the projectile until it disengages from the launch platform; and transmitting said data from the accelerometers to the microprocessor;

iii) determining a net normal velocity (Vn) of the projectile from the acceleration data;

iv) dividing the determined net normal velocity by the initial velocity (VnVi) to calculate Vx; and v) determining the arctangent of Vx via said microprocessor to calculate any angular deviation of said projectile from the pre-launch initial target direction.

8. The jump correcting projectile method of claim 6 further comprising mounting at least one roll rate sensor along the central longitudinal axis of the projectile, said roll rate sensor being attached to said microprocessor.

9. The jump correcting projectile method of claim 6 wherein said at least one pair of accelerometers are mounted along the central longitudinal axis of the projectile at the center of gravity of the projectile.

* * * * *